July 30, 1929.  W. H. SEIDEL, JR  1,722,864
SHIELD FOR AUTOMOBILES
Filed Feb. 24, 1928  2 Sheets-Sheet 1
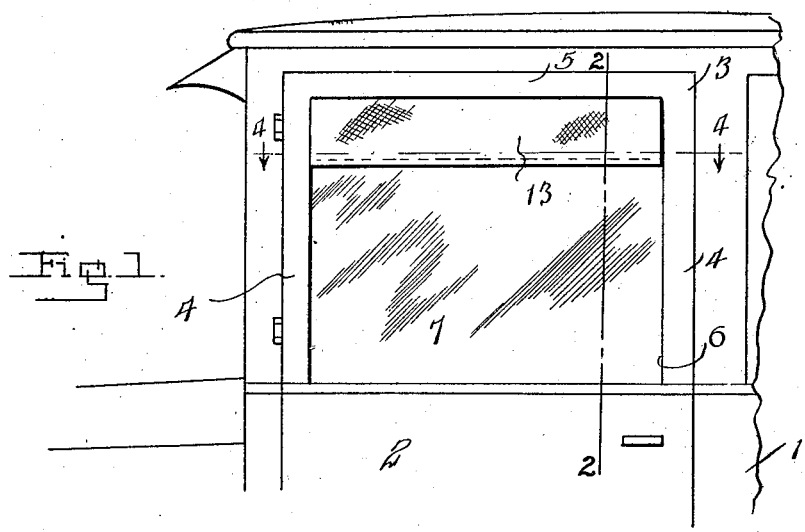
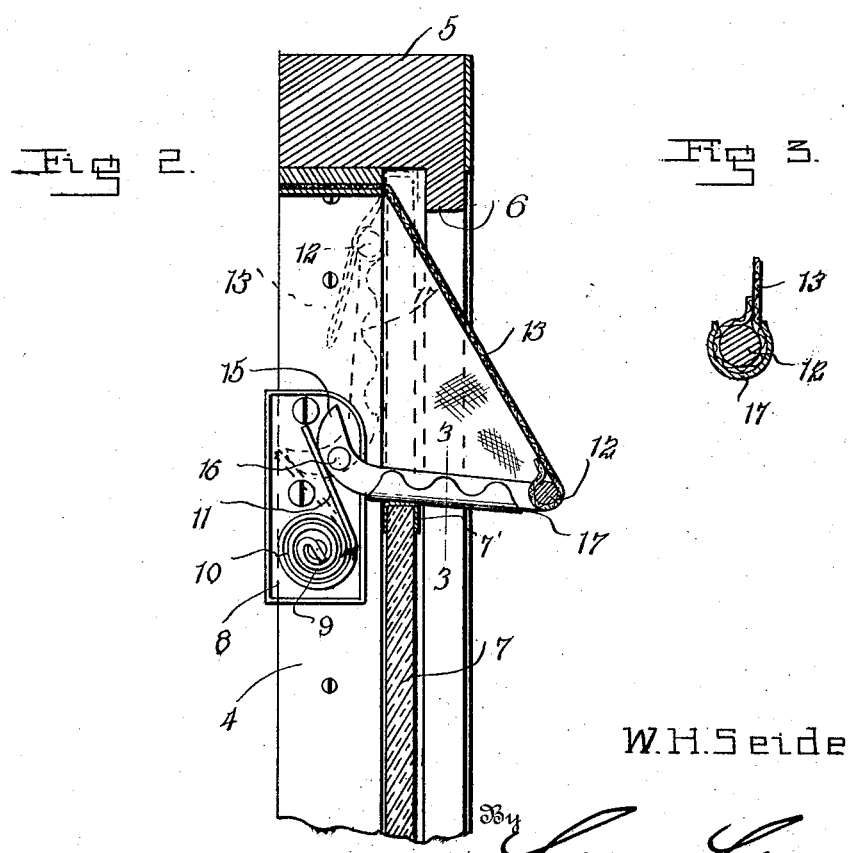
Inventor
W. H. Seidel, Jr.
By Lacey & Lacey, Attorneys July 30, 1929.  W. H. SEIDEL, JR  1,722,864
SHIELD FOR AUTOMOBILES
Filed Feb. 24, 1928   2 Sheets-Sheet 2
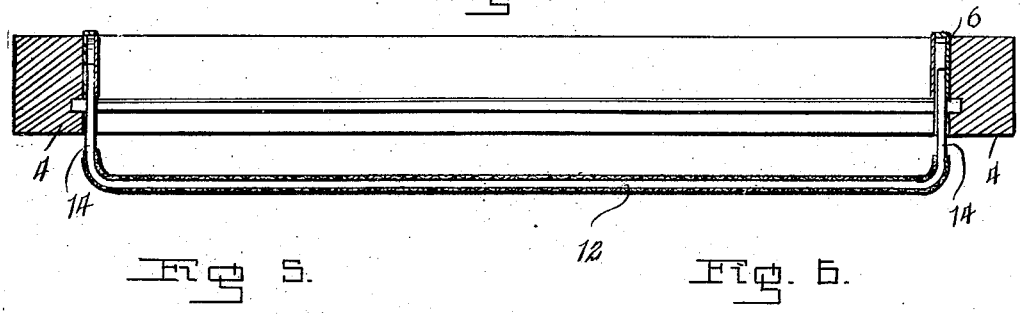
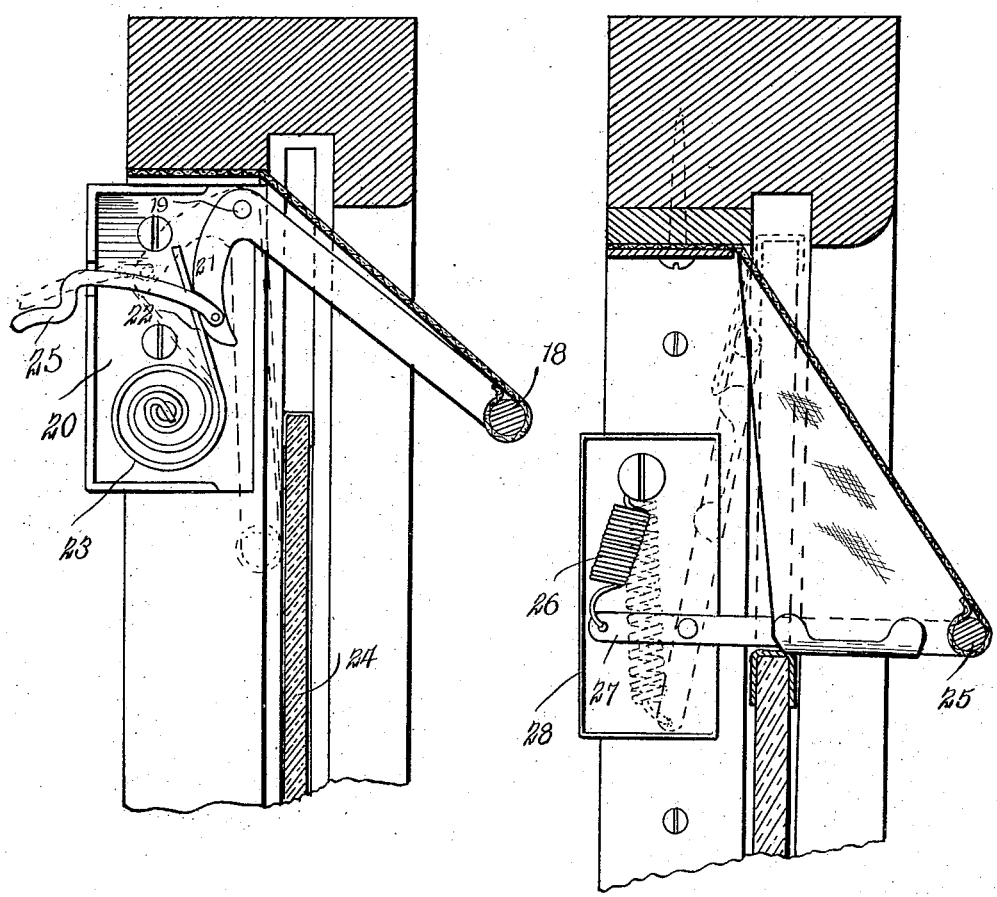
Inventor
W. H. Seidel Jr
By Lacey & Lacey, Attorneys Patented July 30, 1929.

1,722,864

UNITED STATES PATENT OFFICE.

WILLIAM H. SEIDEL, JR., OF PHILADELPHIA, PENNSYLVANIA.

SHIELD FOR AUTOMOBILES.

Application filed February 24, 1928. Serial No. 256,698.

The present invention is directed to improvements in shields for automobiles.

The primary object of the invention is to provide a device of this character adapted to be attached in the window opening of an automobile door to protect the occupants against the glare of the sun, and rain or snow, the construction being such that fresh air can enter the automobile to assure proper ventilation.

Another object of the invention is to provide a shield capable of being automatically folded or unfolded upon raising or lowering the glass window panel, the construction being such that when the panel closes the window opening the shield will be maintained compactly in its folded position and out of the way.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1 is a fragmentary side view of an automobile, showing the device in place thereon.

Figure 2 is a sectional view on line 2—2 of Figure 1.

Figure 3 is a sectional view on line 3—3 of Figure 2.

Figure 4 is a sectional view on line 4—4 of Figure 1.

Figure 5 is a partial vertical sectional view through a car window showing a modified form of the invention.

Figure 6 is a similar view of another modified form of the invention.

Corresponding and like parts are referred to in the following description and designated in the several views of the drawings by like reference characters.

Referring to the drawing, 1 designates a portion of an automobile of the closed type having the usual door 2 which supports a frame 3 consisting of side sills 4 and a top sill 5 which define a window opening 6. The door 1 has carried thereby the glass panel 7 capable of being adjusted to close or partly close the window openings, said panel having a metal boxing 7' carried by its upper edge.

Upon the confronting faces of the side sills 4 are fixed plates 8 to which are secured the innermost terminals 9 of the coil 10, the outermost coils terminating in extensions 11, the purpose of which will be later explained.

The shield comprises a U-shaped metal frame 12 which has secured thereto a cover 13 of water-proof fabric, the upper portion of the cover being secured to the top sill 5 in any approved manner. The side arms 14 of the frame terminate in curved heads 15 which are pivotally connected as at 16 to the plates 8, said heads having certain of their edges intimately engaged with the extensions 11, as clearly shown in Figure 2 of the drawings.

Engaged with the side arms 14 are sheet metal clips 17 which are adapted to slidably engage the boxing 7' when the shield is being closed in a manner to be hereinafter described.

As shown in Figure 2, the shield is open and at which time the clips 17 rest upon the boxing 7', and owing to the fact that the extensions 11 are yieldably engaged with the heads 15 said shield will be held firmly in its open or unfolded position, and at which time the clips rest upon the boxing. It will be obvious that when the panel 7 is elevated the frame 12 will be swung upwardly to the position shown in dotted lines, thus permitting the window opening to be wholly closed by the panel. As long as the panel is in its closed position the shield will be held folded, but when the panel is lowered the coils 10 will cause the extensions 11 to exert pressure upon the heads 15, whereupon the shield will be unfolded and during the unfolding thereof the clips 17 will slidably engage the boxing 7'. Owing to the presence of the clips 17 the fabric connected to the side arms 14 of the frame will be protected against wear, and friction will be reduced to a minimum. It will thus be seen that upon raising or lowering the panel 7 the shield will be automatically closed or opened, and when in its open position will permit the entrance of fresh air to ventilate the interior of the vehicle.

In Figure 5 is illustrated a modified form of the invention, wherein the frame 18 has its side arms pivotally connected, as at 19, to the plates 20, said arms having curved terminal heads 21 which are engaged with the extensions 22 of the coils 23. As shown in dotted lines in Figure 5 the frame is held in its folded position when the panel 24 is elevated, and will automatically open when the panel is lowered a sufficient distance to permit the frame to disengage the same, whereupon the frame will automatically open under the action of the extensions 22 and coils 23. The heads 21 have pivotally connected thereto handles 25 which may be grasped in order to swing the frame inwardly to the dotted line position when it is desired to fold the device.

In Figure 6, another modified form of the invention, the operation is the same as that of the preferred form of the invention, but in lieu of the heads 15 and coils 10, coil springs 26 are provided for connecting the arms 27 to the plates 28.

Having thus described the invention, I claim:

1. The combination with the door of an automobile having a window frame, of a glass panel carried by the door and slidable in the opening of the window frame, a folding shield including a frame pivotally mounted in the opening, said frame being foldable and unfoldable by the panel when said panel is subjected to sliding movement.

2. The combination with the door of an automobile having a window frame, of a glass panel carried by the door and slidable in the opening of the same, a shield consisting of a U-shaped frame having its side arms pivotally connected to the side sills of the window opening, a cover carried by the U-shaped frame, resilient means carried by the side sills for engagement with the side arms of the U-shape frame for normally urging said frame to its unfolded position, the panel being slidably engaged with the U-shaped frame, for closing the same against the yielding means when the panel closes the window opening.

3. The combination with the door of an automobile having a window frame, of a panel carried by the door and slidable in the opening of the frame, a shield including a U-shaped frame having its side arms pivotally connected with the side sills of the window frame, springs carried by the sills of the window frame, extensions associated with the side arms of the U-shaped frame and engaged with the springs for holding the U-shaped frame engaged with the upper edge of the panel, said arms operating in opposition to the springs when the panel is elevated to fold the frame.

4. The combination with the door of an automobile having a window frame carried thereby, of a shield including a U-shaped frame pivotally mounted in the opening of the frame, a glass panel slidable in the door and window frame, said panel being adapted to slidably engage the U-shaped frame to fold the same when the panel is elevated, and to maintaain the same folded after elevation.

5. The combination with the door of a vehicle having a window frame carried thereby, of a shield including a U-shaped frame pivotally mounted in the opening of the window frame, a panel slidable in the window frame adapted, when covering the window frame opening to hold the frame folded, and permit unfolding thereof when the panel is lowered in said opening.

In testimony whereof I affix my signature.

WILLIAM H. SEIDEL, Jr. [L. S.]